(12) United States Patent
Ramesh

(10) Patent No.: US 6,843,543 B2
(45) Date of Patent: Jan. 18, 2005

(54) WEATHERPROOF ENCLOSURE WITH A MODULAR STRUCTURE

(76) Inventor: Roahan Ramesh, No 8, (New No 13) 4th Cross St, Ormes Road, Kilpauk, Madras-600010 (IN)

( * ) Notice: Subject to any disclaimer, the term of this patent is extended or adjusted under 35 U.S.C. 154(b) by 75 days.

(21) Appl. No.: 10/182,321

(22) PCT Filed: Jun. 22, 2001

(86) PCT No.: PCT/IN01/00121

§ 371 (c)(1), (2), (4) Date: Jul. 26, 2002

(87) PCT Pub. No.: WO03/001637

PCT Pub. Date: Jan. 3, 2003

(65) Prior Publication Data

US 2003/0034716 A1 Feb. 20, 2003

(51) Int. Cl.7 ............................................. A47B 43/00
(52) U.S. Cl. ................................... 312/100; 312/257.1
(58) Field of Search ............................ 312/100, 287, 312/257.1, 263, 265.5, 138.1, 109, 108, 107, 245, 111, 140; 220/4.02, 4.26, 4.28; 174/4.28, 50; 52/79.5, 592.3, 270, 284; 361/724

(56) References Cited

U.S. PATENT DOCUMENTS

| | | | | |
|---|---|---|---|---|
| 892,187 A | * | 6/1908 | Schriefer ..................... 312/107 |
| 2,339,339 A | * | 1/1944 | Kaser .......................... 312/108 |
| 3,274,451 A | * | 9/1966 | Laity ........................... 361/724 |
| 3,378,320 A | * | 4/1968 | Morgan et al. .............. 312/108 |
| 4,650,262 A | * | 3/1987 | Debus et al. ............. 312/257.1 |
| 4,862,324 A | * | 8/1989 | Kalvaitis et al. ............ 361/724 |
| 5,240,317 A | * | 8/1993 | Presnick ...................... 312/263 |
| 5,280,132 A | * | 1/1994 | Clarey et al. .................. 174/50 |
| 5,902,025 A | * | 5/1999 | Yu ............................... 312/109 |
| 5,931,553 A | * | 8/1999 | Cohen ......................... 312/263 |
| 6,471,308 B1 | * | 10/2002 | Konshak et al. ............ 312/108 |

FOREIGN PATENT DOCUMENTS

| | | |
|---|---|---|
| DE | 1 088 578 | 9/1960 |
| DE | 2 220 850 | 11/1973 |
| EP | 0 252 195 A2 | 1/1988 |

* cited by examiner

Primary Examiner—Janet M. Wilkens
(74) Attorney, Agent, or Firm—Ladas & Parry LLP

(57) ABSTRACT

A weatherproof enclosure is disclosed with a modular structure suitable for outdoor use for protecting equipments such as electrical, electronic equipments and instruments. The enclosure has a side wall panel assembly constructed from plurality of side wall straight panel members and side wall corner panel members. The side wall panel assembly is provided with a side wall frame assembly and a door assembly having matching door frame assembly corresponding to the side wall frame assembly. The door assemblies may be provided on both sides of the side wall panel assembly. A double door assembly also can be provided on front or back of the side wall panel assembly.

16 Claims, 18 Drawing Sheets

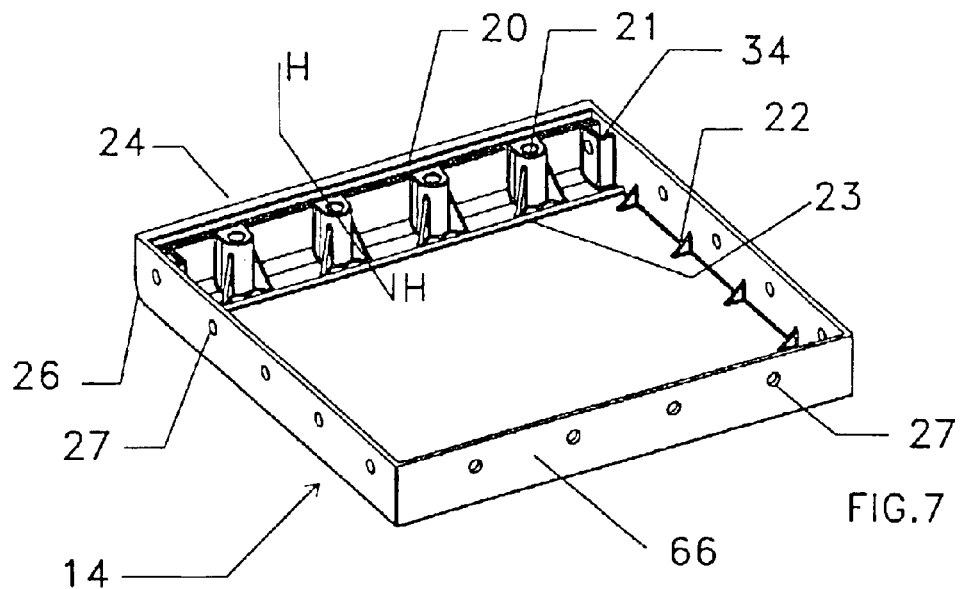
FIG.7
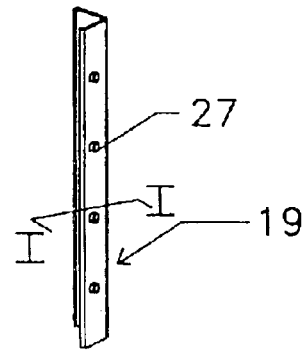
FIG.8
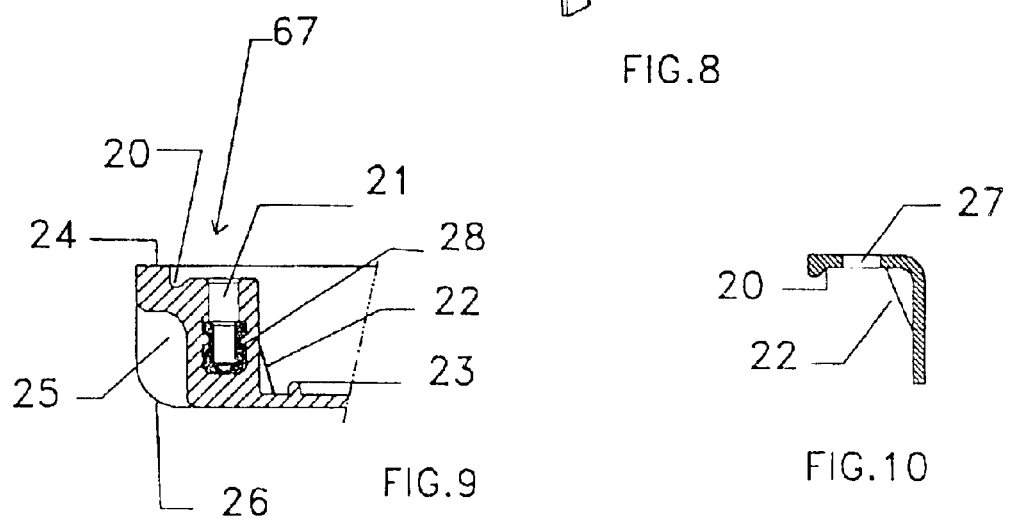
FIG.9
FIG.10

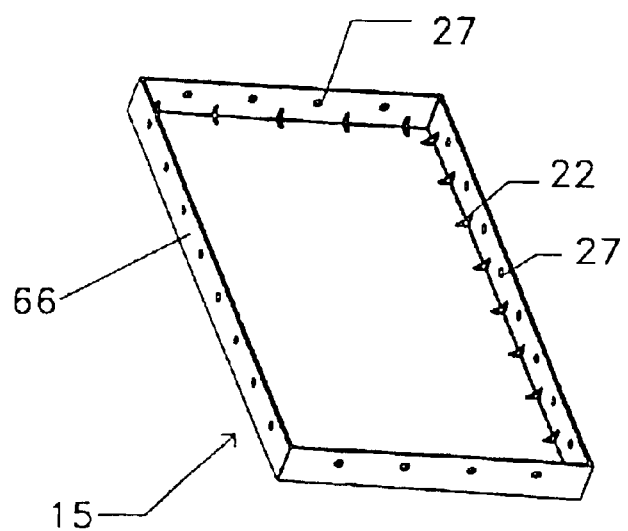
FIG.11
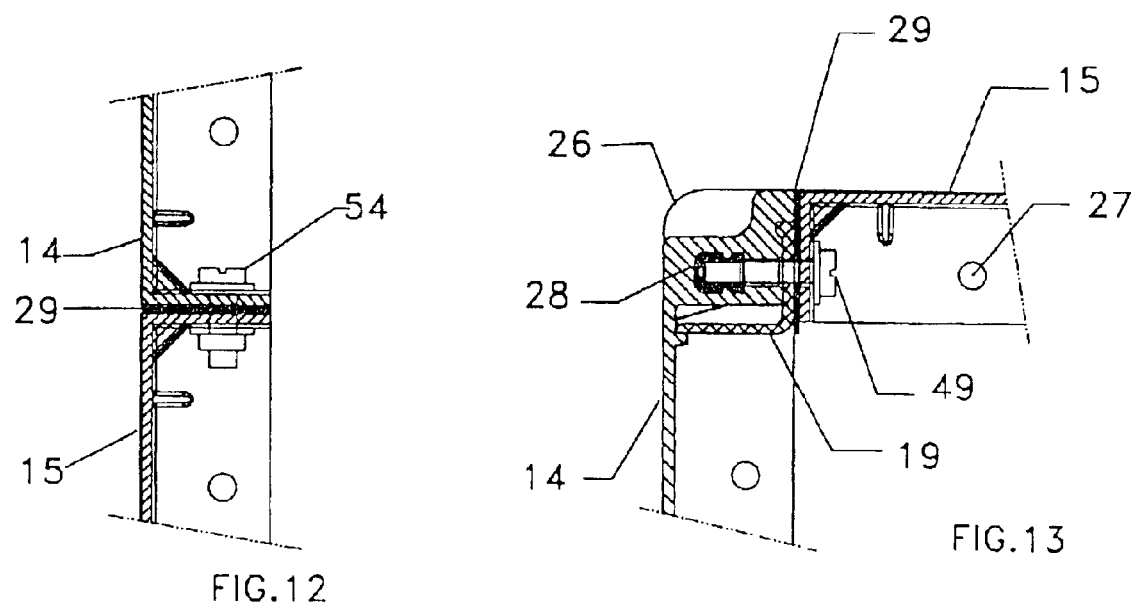
FIG.12
FIG.13

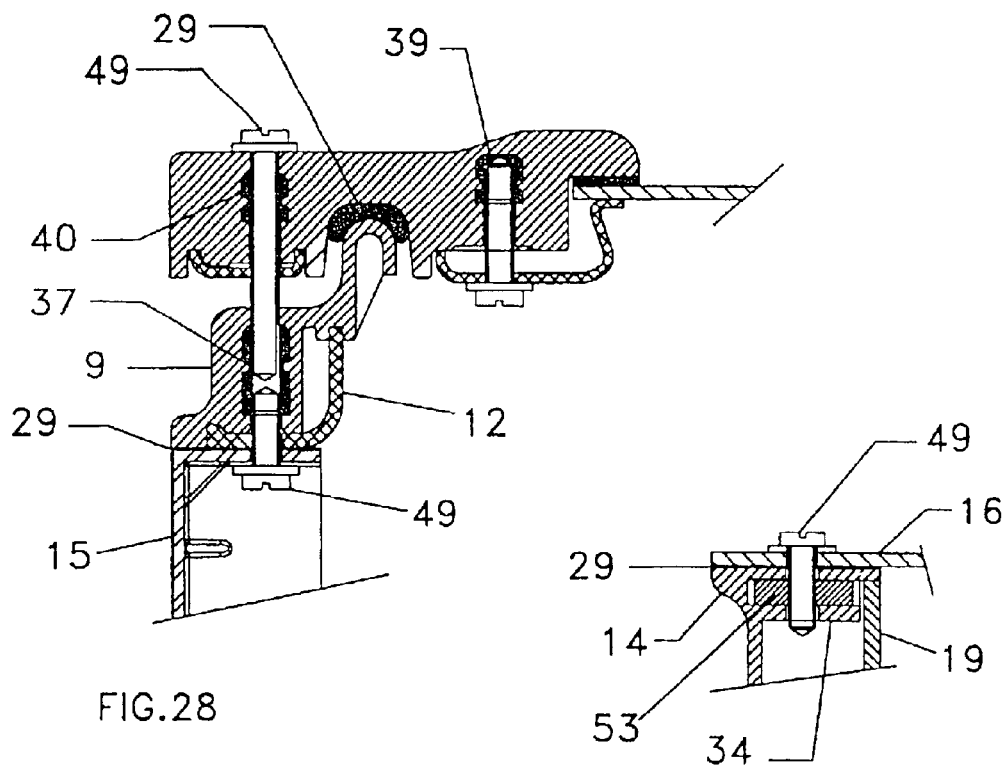
FIG.28
FIG.29
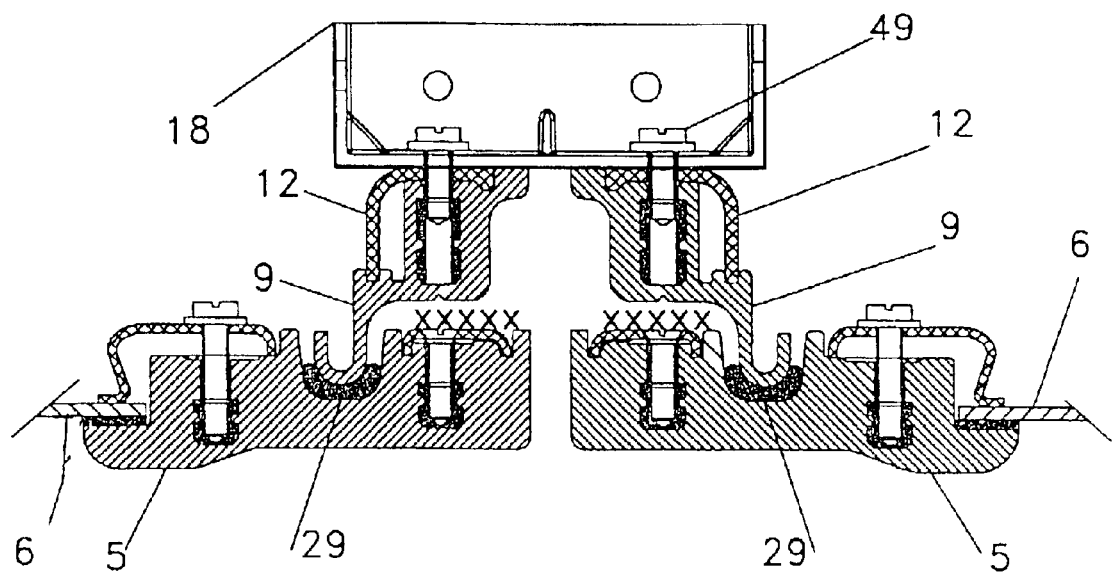
FIG.30

WEATHERPROOF ENCLOSURE WITH A MODULAR STRUCTURE

FIELD OF THE INVENTION

This invention relates to weatherproof enclosure with a modular structure suitable for outdoor use for accommodating equipments such as electrical, electronic parts, instruments, junctions, etc.

BACKGROUND OF THE INVENTION

Enclosures are used for protecting, electrical junctions, switches, equipments, instruments, etc. from outdoor weathering conditions, thereby providing reliable service for the intended applications over an extended period of time requiring minimum maintenance.

Metal enclosures are still widely used mostly of steel, aluminium or SS. Metal enclosures need frequent painting in addition to finishing, surface treatment, galvanizing, etc. to provide extended weathering ability.

With wide acceptance of polymers, especially fibre reinforced polymer composites for outdoor use, several manufacturer's offer polymer enclosures.

These enclosures primarily comprise of two members, one a side wall assembly or enclosure body with provision for housing the equipment to be protected and a door or cover to seal the contents in the body.

The enclosure body is made with a integral continuous projection or tongue all around the upper periphery and the cover made with a matching integral continuous groove, fixed with a elastomeric seal preferably a seamless formed-in-place gasket. When the body and cover are held together by means of screws and nuts provided on the cover and body respectively or by means of hinges and fasteners, the elastomeric gasket gets compressed between the tongue and the groove and the enclosure gets sealed to achieve a high level of ingress protection.

Medium to large enclosures with increasing size with respect to length, breadth and depth, such or similar integral body and cover designs become expensive, due to high cost of moulds, process equipment, processing and transportation cost.

Some manufacturers attempted to make such medium to large enclosures in modular design, wherein the body is assembled with standard modules having a bottom, top and at least two sides and fitted with an integral rear cover and hinged or removable integral front cover. In some cases, a common rear and front covers are used.

The disadvantage in the above mentioned type of enclosure is that though the tongue formed integrally out of sides, top and bottom part of the body, is not continuous at the junctions resulting in reduced the level of ingress protection. In addition, as the cover is integral with a continuous groove, and the body parts are mostly made individually for each size, the mould costs and associated processing costs are still high.

OBJECT OF THE INVENTION

The principal object of this invention is to provide a weatherproof enclosure with modular structure made of composite polymers or metals, capable of being assembled to a wide range of enclosure sizes made from simple, small accurate standard set of modules, or parts where each such assembled enclosure has a matching continuous tongue and groove sealing arrangement in body and cover to obtain a high level of ingress protection.

Other objectives of the invention include:
1) Capability of assembling a wide variety of Enclosures with
    a) door at either ends,
    b) see through door,
    c) two or more door on each end,
    d) sloped roof,
    e) large length, width and depth, etc.
  Such variety of capabilities are achieved with simple set of modules or parts.
2) Flexibility in design up-gradation due to modular design.
3) Max. standardization to reduce inventory.
4) Reduced capital costs in tools/moulds, processing equipments
5) Reduced packing cost and transportation costs.

Other objects and further scope of applicability of the present invention will become apparent from the detailed description given herein, and it should be understood, however that the detailed description, while indicating preferred embodiments of the inventions, are given by way of illustration only, since various changes and modifications within the spirt and scope of the invention will become apparent from such description. Though the enclosure according to the invention can have three or more sides, the descriptions below is mainly directed to an enclosure with four sides for convenience.

SUMMARY OF THE INVENTION

The invention provides a weatherproof enclosure having a modular structure with following features:

a) A plurality of elongated side wall straight panel members and at least one type side wall corner panel with a matching side wall corner stiffener. All such side wall straight panel members have same width, and differing lengths, with integral flanges on all four sides. All side wall straight panel members on the width-side preferably have same number of holes at constant pitch and the length-side have holes at regular pitch, with the number of holes varying depending on the length along the length-side.

The side wall corner panel member preferably has constant length and same width as that of the side wall straight panel members, has integral flanges on all four sides, one integral flange on the width-side has a corner with radius on the outside and with a flange having a thicker wall with integral metal nuts formed below a boss along this wall and the number of metal nuts equal that of the number of holes on the width-side of side wall straight panel members. The holes on other width-side flange are equal to the number of metal nuts and the holes on the remaining two flanges match the straight panel length-side hole pitch.

Each side wall corner panel member is provided with two integral pockets for holding two metal nuts, and such pocket located behind the extreme length side holes adjacent to the integral metal nuts on both ends.

A side wall corner panel stiffener member, shaped like an 'L' angle with holes to match each of the integral nuts, is made with a profile to fit inside the corresponding inner profile on the side wall corner panel member, provides rigidity and a flat surface to the side wall corner panel member when tightened against the width-side flange of the adjacent side wall straight panel member when a perpendicular joint is required, to form, the corners of the enclosure. The stiffener also retains the metal nuts provided in the two pocket of each side wall corner panel. All above members are preferably provided with ribs to increase the rigidity and strength.

The width of the side wall panel members to determine the depth of enclosure. Differing lengths of side wall straight panel members, and constant length of side wall corner panel members may be used to assemble the desired size of enclosures, with optimal number of members.

The assembling of the enclosure is started by suitable selection of required types and quantity of side wall straight panel members and side wall corner panel members with stiffeners and metal nuts and joining each other with gaskets, nuts and bolts, to achieve the required length and width of the desired size of enclosure. The gasket used for sealing all the joints comprise of elastomeric or polymeric materials in suitable form.

The side wall assembly of the enclosure thus formed is open at both ends and has flanges with holes at constant pitch all around the periphery in the front and rear and with nuts each retained in the respective pockets provided at each of the side wall corner panel members to receive the respective members to complete the enclosure.

To double the depth of the total enclosure, two such side wall assembly of the enclosure described above need to be connected to each other through the holes on peripheral flanges with gaskets, suitable nuts and bolts to make a side wall assembly of the enclosure with double depth. However care is taken to ensure that all the side wall corner panel members and side wall straight panel members are joined together in pairs first. Then the metal nuts are placed in the extreme available pockets, followed by placing the corresponding stiffeners and assembling all the other required side wail straight panel members together.

To obtain different depths of enclosure, the width of the side wall panel members may be made with required widths.

b) A plurality of elongated straight side wall frame members of different lengths, a side wall frame corner member and all each such part having a matching stiffener member.

The different lengths are selected to match the desired range of enclosures sizes.

All side wall frame members have similar outer and similar inner profile and each with flange on either end having matching holes and with provision for joining each other with nuts and bolts. All side wall frame members are provided on the inside with integral metal nuts below bosses spaced at intervals to match the holes pitch of the side wall panel length-side holes excepting one position at the perpendicular junction on side wall frame corner, which has a counter bore from the outside profile instead of a integral metal nut, to allow a bolt to go thru and fasten on to the nut provided in the pocket on the corresponding position on the side wall corner panel, as access is not available from inside.

All side wall frame members on the outer profile are provided with pips to indicate location of integral nuts below, such that when drilled at these required pips, the metal nut is exposed for fixing the hinge-lock mechanism, from the other end.

As an alternate to providing the expensive integral metal nuts in all side wall frame members, a square or hexagonal recess or counter bore is provided on the outer profile, to later house a metal part with threadings, with access hole for joining to the side wall frame from inside with bolts. The other end of the metal nut is available for fixing required hinge-lock mechanism. All such joining done with seals or 'O' rings for ingress protection.

Each of the side wall frame member is provided with a corresponding side wall frame stiffener member. The stiffener part is shaped like an 'L' angle with holes to match the pitch of the integral nuts and made with a profile to fit inside the inner profile of the corresponding side wall frame member, for increasing rigidity and to provide a continuous flat surface for sealing with gaskets when bolted down to the corresponding position on the peripheral flange, on the side wall panel assembly of the enclosure.

When the required series of such side wall frame members of different lengths and four side wall frame corner members with their matching stiffeners are joined with each other by nuts, bolts and gasket and such complete side wall frame assembly when joined by bolting and gaskets to the peripheral flange on the side wall panel assembly of the enclosure, a side wall assembly of the enclosure with a continuous tongue is formed, such assembly can be done on both ends to provide for enclosures with doors at both ends.

c) A door frame assembly comprising plurality of straight door frame members of different lengths and same width to suit the desired size of the door assembly and door frame corner members.

Each of such door frame member is provided with a flange at both ends with matching holes to join with each other, and have a similar outer profile, and on the inside integral metal nuts are provided at equal intervals in two rows, one row on the inside for bolting down a plane sheet of metal or composite or a transparent polymer with steel clamping members, and another row on the outside along with two slot profiles for clamping a steel or composite stiffening members along with the hinges and multi-point locking mechanism at required locations.

The outer row of metal nut pitch match the hole-pitch of all side wall panel length-side hole-pitch, and in between these two rows of integral nuts, each of these door frame members have a groove profile matching the tongue profile on the side wall frame member.

Each stiffening member connects all the door frame members together in each length-side and width-side direction. When they are bolted down to the integral metal nuts on each door frame member, and they themselves get bolted together on the integral metal nut at the perpendicular junction of each door frame corner, providing the necessary stiffness for the door frame. As the hinge-lock mechanism are located outside of the tongue and groove sealing area & results in avoidance of extra care for sealing such joints to avoid ingress protection. The steel members, hinge-lock mechanism, etc. are well known and is not elaborated more.

A plurality of such door frame members to complete the required door frame assembly when joined to each other with gaskets, nut and bolts and clamped on to the steel stiffening members all around forms a rigid complete door frame assembly, having a continuous groove profile to match the continuous tongue profile described earlier. An elastomeric gasket either a foamed-in-place or profiled elastomeric seal is placed, in this continuous groove. On this door frame assembly, a sheet of metal or a composite polymer is clamped on to the inner row of nuts with gaskets and steel or composite clamping members all around with sealing gaskets. Finally, the required hinges and one part of locking mechanism is joined on to the outer row of nuts over the stiffening members, providing the door assembly.

d) The side wall assembly of the enclosure with a continuous tongue when fitted with a complete door, without hinge-lock mechanism, elastomeric seal and steel stiffening members on the rear peripheral end with gaskets, and bolted rigidly to the rear peripheral flange, a side wall assembly of the enclosure is formed with a fixed rear door. However, care is taken at the four corners of door assembly where the metal inserts are opened through from inside and a counter bore provided such that a bolt can pass through the metal nut and directly screw on to the metal nut provided in the pockets of the corner side wall.

Alternatively, a plane sheet of metal or composite polymer when directly fixed with nuts, bolts and gaskets on to the rear peripheral flange of the side wall of the enclosure provides side wall assembly of the enclosure with a less expensive plane rear cover.

e) The side wall assembly of the enclosure as described above when joined to a complete door with bolts at the corresponding hinge point locations, on the side wall frame assembly and also the other part of locking mechanism fitted at corresponding locations on the opposite ends of the side wall frame assembly at matching locations, or fitted with screws rigidly bolted on the body at required intervals then an enclosure of desired size is achieved with a hinged door or screw down door.

If a side wall assembly of the enclosure with continuous tongue on both ends is fitted with a door assembly, then a complete desired enclosure is achieved having doors at both ends.

f) Variants in the side wall straight panel members with a tapered profile when joined to a side wall panel assembly of the enclosure at the top and fitted with all other members as described, provide an enclosure with a tapered roof.

g) Special 'L' angle profile members of different lengths when bolted on at the bottom of side wall and with all other members as described produce enclosures that have complete bottom opening for cable entry, as desired.

h) Special contoured L angle of composites or metal equal to the width of enclosure is clamped on the side wall frame top end with gaskets at required interval through the opened pip ends of the integral metal nuts provide a shade or prevent accumulation of dust, water, etc. on junction of door frame and side wall frame at the top portion of the enclosure.

i) An enclosure of required longer length, width or depth called as cabinet type enclosures are joined with a series of standard members as required or specially made longer straight lengths of side wall straight panels, door frame and side wall frame members with corresponding stiffeners to reduce the number of members, resulting in fewer joints and cost.

The Body of such large cabinets if necessary, are provided extra rigidity by suitably clamping stiffening members of steel or composite polymer profiles at the various existing bolting points at the required lengths and widths inside the enclosure.

j) A locking mechanism provided on all three sides of the door except the hinge side for wider and longer doors to ensure adequate ingress protection of larger enclosures, as required.

k) Variants in the side wall corner panel members called as middle corner support members of suitable width are used for accommodating two doors side by side, and with length equal to the width of regular side wall corner panel members, and middle straight support members of width equal to side wall corner panel member and different lengths equal to the standard side wall straight panel members when joined together either on front or rear from bottom to top provide necessary peripheral flange for mounting two independent door assemblies.

Alternatively, the two independent door assemblies can be provided using only the middle straight support members at the top and bottom instead of a middle corner support members and joined along with a 'C' type side wall corner panel members for providing the corners.

l) A plurality of one type of members joined to each other by adhesives, and each such series joined to each other also by adhesives provide a rigidly bonded integral bodied enclosure, or some or all members joined by fusion methods.

m) A transparent sheet fitted on the complete door instead of a composite polymer or metal sheet to provide the required enclosure with transparency for special applications.

n) All or some series of members made of metals, and or composites, and or polymers to make required enclosure.

o) An enclosure as described above with all side wall straight panel members of different lengths and without side wall corner panel and side wall corner panel stiffener but with a 'C' type side wall straight panel member whose width is equal to the width of the flange and length is equal to the width of the side wall straight panel member are joined together with all other members to make a required enclosure.

p) A plurality of earlier described door frame corner and elongated straight door frame corner members may be made without integral nuts on the inside row but with flanges having holes at a specific pitch with provision for joining the adjacent members together and a plurality of door panel members, similar to side wall straight panel members having flange holes to match with the flange holes on door frame members and when such a select series of members are sealingly joined with each other provide the desired enclosure with a door assembly made with panel members instead of a plane sheet.

q) An enclosure made with a continuous profile for the door frame straight members, and the side swall straight members such profiles cut at matching angles at ends to the required lengths and widths of the enclosure as one piece and joined sealingly to form the corners with a corner piece having a outer profile matching the inner profile of the door frame member.

r) An Enclosure as described above packed in completely knocked-down condition is as compact as possible for shipment and transportation to be assembled at site to reduce transport cost.

BRIEF DESCRIPTION OF THE DRAWINGS

A more complete understanding of the invention can be obtained by reference to the accompanying drawings in which:

FIG. 7. is a perspective view of a sidewall corner panel member.

FIG. 8. is a perspective view of a sidewall corner stiffening member.

FIG. 9. is a sectional view at HH of FIG. 7

FIG. 10. is a sectional view at II of FIG. 8

FIG. 11. is a perspective view of a sidewall straight panel member.

FIG. 12. is a sectional view at CC of FIG. 1

FIG. 13. is a sectional view at BB of FIG. 1

FIGS. 28. is another embodiment of the section AA in FIG. 1.

FIG. 29. is a sectional view at DD in FIG. 1

FIG. 30 is a sectional detail view at FF in FIG. 5.

DETAILED DESCRIPTION OF THE DRAWINGS

Figure 1:
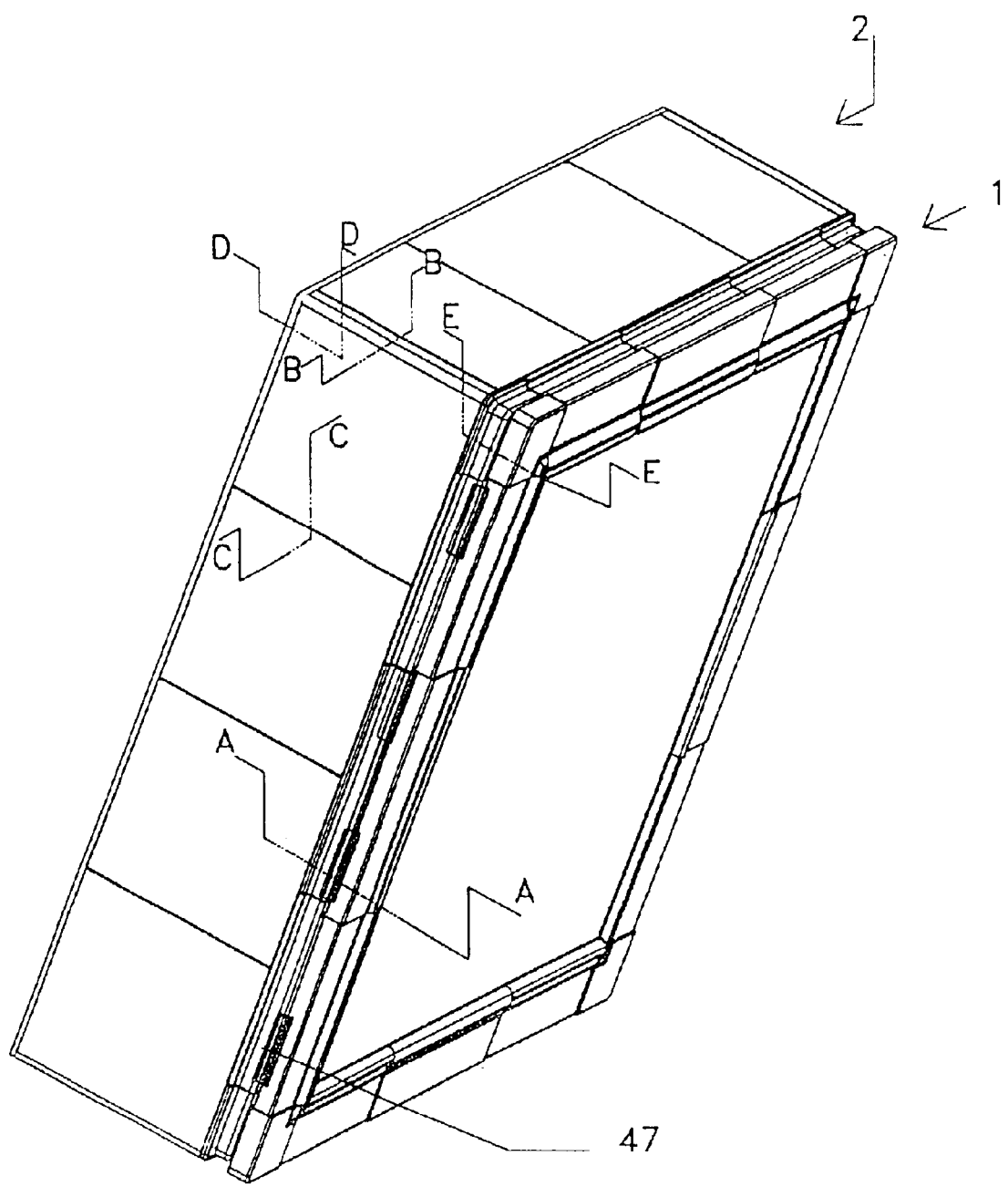
FIG. 1. is a perspective view of an enclosure with a plane rear cover.

FIG. 1 is a perspective view of one preferred type of enclosure with doors at either end in accordance with the invention, wherein 47 indicates the position of hinge-lock mechanism provided on either side on each door.

Figure 2:
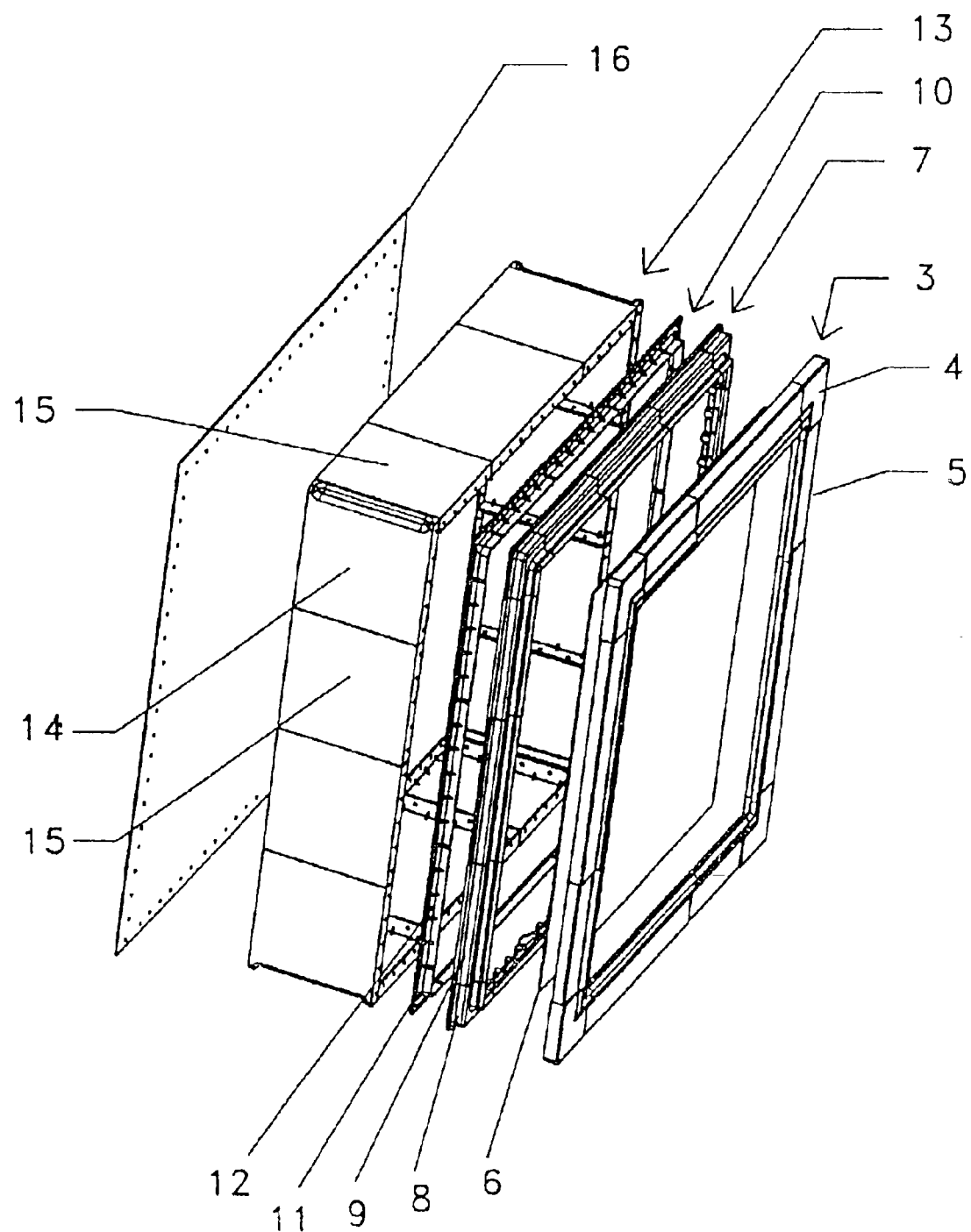
FIG. 2. is an exploded view of FIG. 1

FIG. 2 is an exploded view of FIG. 1, wherein the door assembly 1 is made up of a door frame assembly 3 comprise of plurality of, door frame corner members 4, and elongated straight door frame member 5. 6 is a cover sheet, 7 is a side wall frame assembly. 8 is side wall frame corner members, 9 is an Elongated straight side wall frame members of a particular length. 10 is a plurality of side wall frame corner and elongated stiffener members wherein each of such members match with each of the corresponding members in the side wall frame assembly. 11 is a side wall frame corner stiffener member. 12 is an elongated straight side wall frame stiffener. 13 is a side wall panel assembly, 14 is a side wall corner panel member and 15 is a side wall straight panel members. 16 is a back sheet cover. FIG. 2 does not show the position of the sealing, fixing and joining means, stiffener and clamping members, etc. so as to make the drawings more readable, as these are standard parts and well known in the art.

Figure 3:
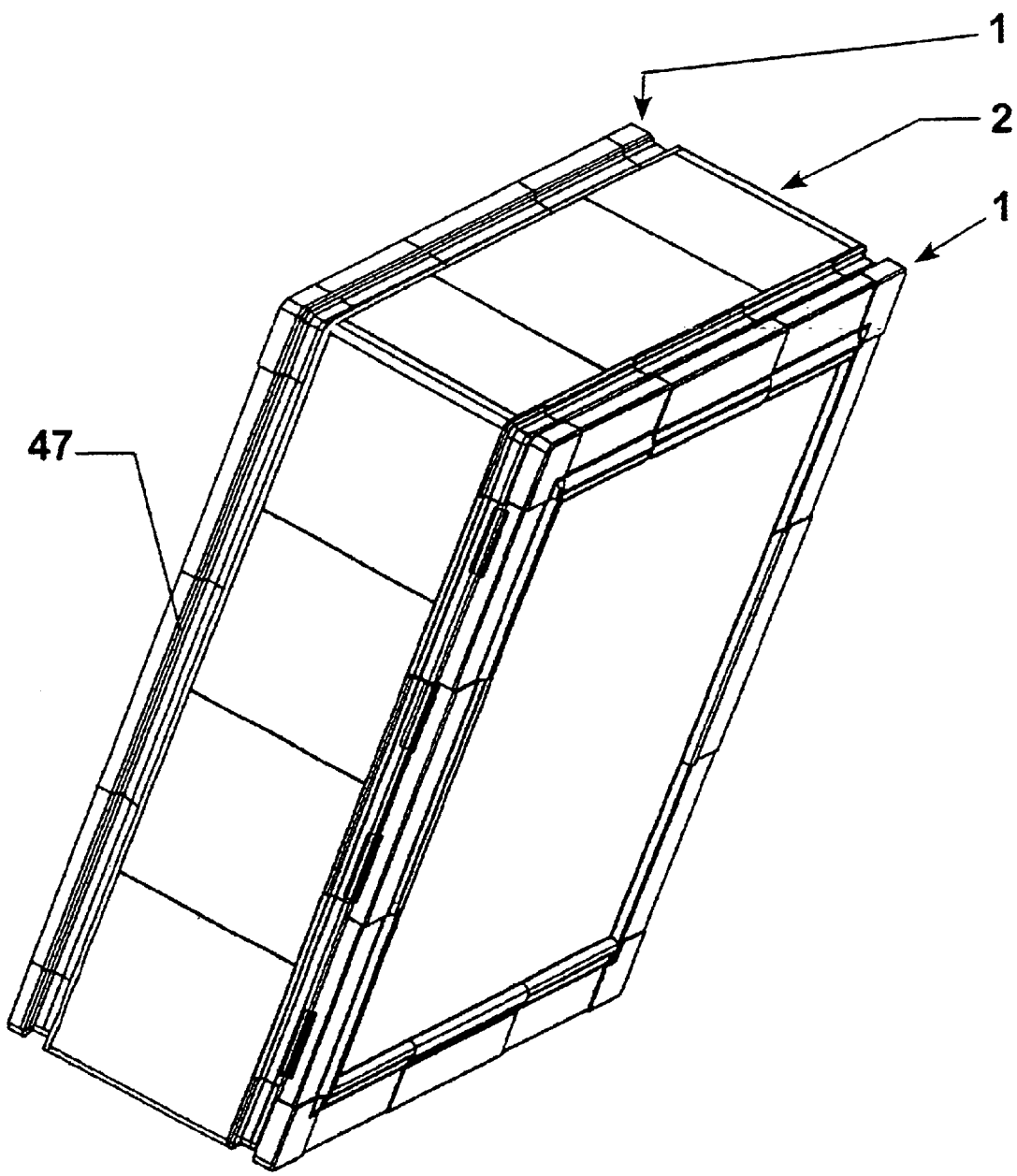
FIG. 3. is a perspective view of an enclosure with doors at both ends.

FIG. 3 is a perspective view of an enclosure with doors at both ends.

Figure 4:
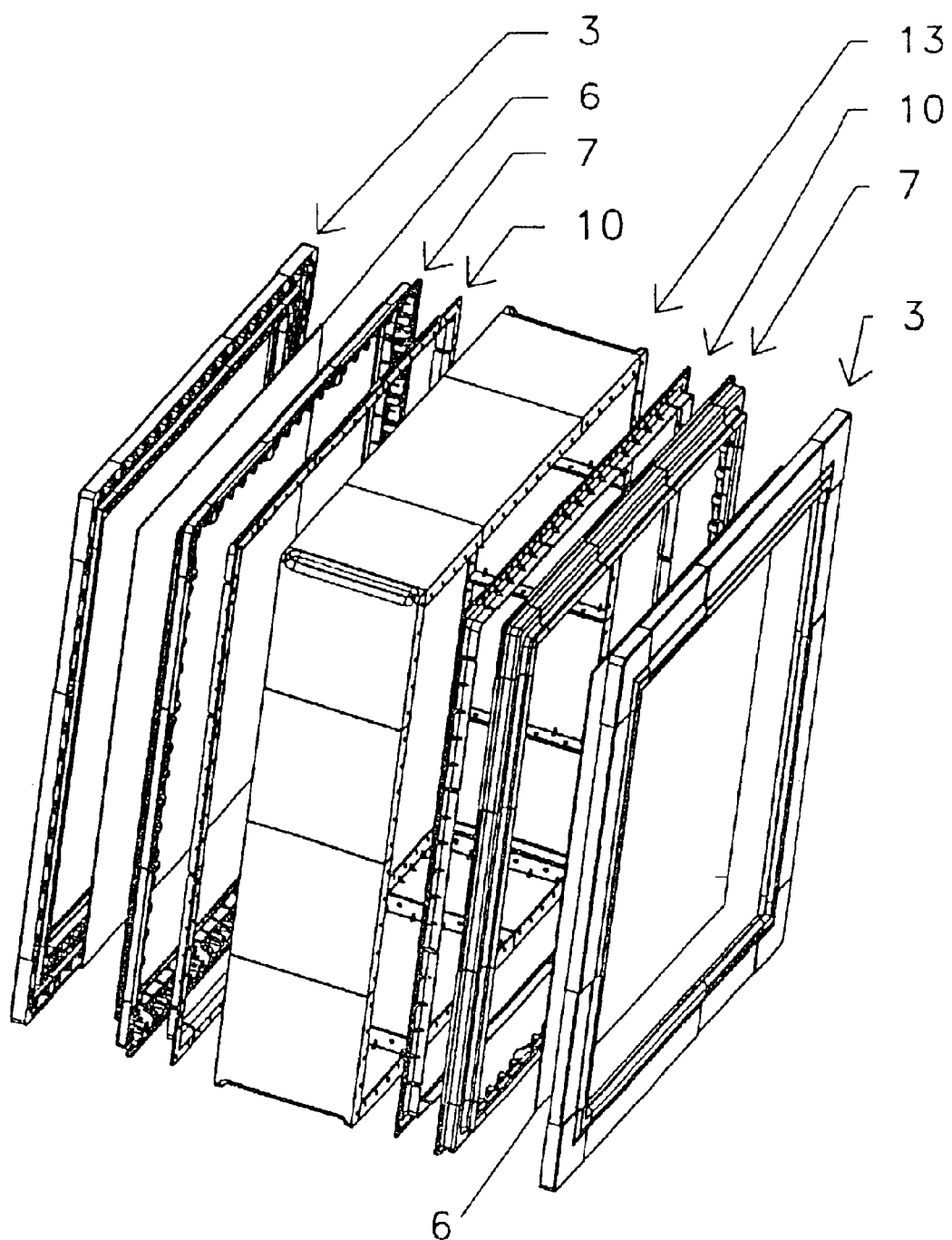
FIG. 4. is an exploded view of FIG. 3

FIG. 4 is an exploded view of FIG. 3 showing the door assembly 3 at both ends.

Figure 5:
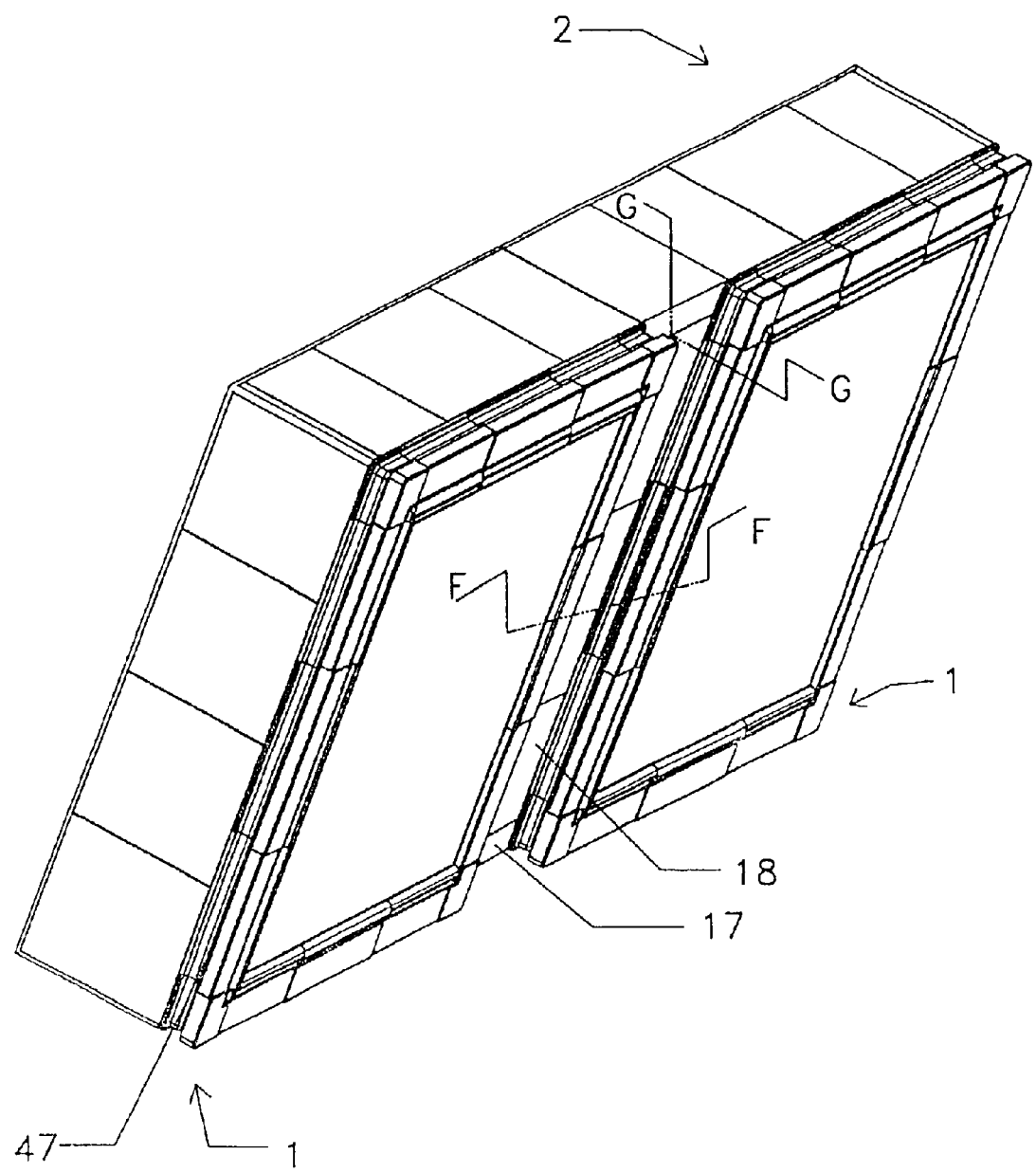
FIG. 5. is a perspective view of an enclosure with double doors in front and with a plane rear cover.

FIG. 5 is a perspective view of an enclosure with double doors in front, comprising of two door assembly 1 and having a common side wall assembly 2.

Figure 6:
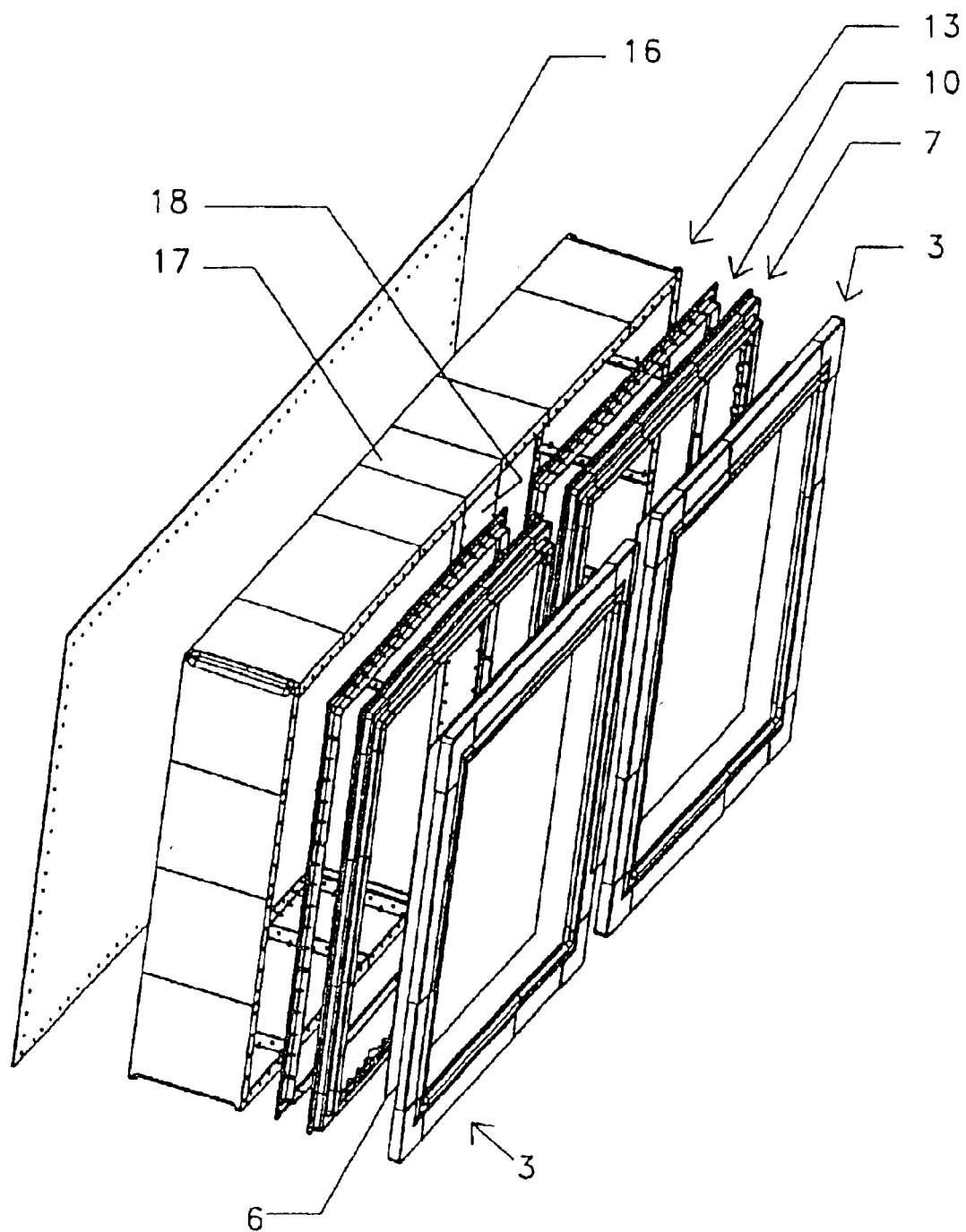
FIG. 6. is an exploded view of FIG. 5.

FIG. 6. is an exploded view of FIG. 5 wherein the 17 is a middle corner support member and 18 is a middle straight support member of different lengths to allow two sidewall frame assembly 7 to be mounted on the front periphery such that two door frame assembly 3 can be fitted on.

FIG. 7. is a perspective view of a sidewall corner panel member with a fixed length and width and having flanges 66 on all four sides like a tray. One flange on the width-side has a radiused corner 26 with a thicker flange with a flat surface 24, this flange has boss 21 equally spaced with integral metal nuts located inside, for fitting a bolt or a blind hole to drive in a self-taping screw and forms the corner fixing means 67. Below the flat surface 24 is a side wall corner panel profile 20 on the inner width and joining to the boss 21 at meeting points, the boss 21 is supported by ribs 22 for extra rigidity, adjacent to ribs 22, a groove 23 is formed through the inner width. Holes 27 on opposite width-side flange 66 have the same pitch as boss 21 pitch. Holes 27 on the length-side flanges have a pitch at regular intervals, the corner hole 27 near the radiused corner 26 on both sides has a pocket 34 to accommodate a nut 53 in position for joining as there is no access to hold the nut at these extreme corners.

FIG. 8 is a perspective view of a side wall corner stiffening member 19, shaped like an 'L' angle and has a length equal to the inner width of side wall corner panel member 14, and one inner end having a profile 20 to match the similar profile 20 in 14. The side wall corner stiffener member 19 has through holes to match the boss 21 and the other end sits in between the groove 23 and 20 of 14. The purpose of this side wall corner stiffener member 19 is to provide stiffness and strength to the side wall corner panel member 14, and to provide a flat surface as continuity to flat surface 24 of 14 to match with the flange of the next side wall panel when joined together, and also to hold the nuts 53 located in pocket 34.

FIG. 9 is a section view at HH in FIG. 7 showing the integral nut 28 below boss 21. 25 is the portion at corner 26, where the excess material is removed to reduce the mass. The fixing means 67 comprise of integral nuts 28 and boss 21. FIG. 10 is a sectional view at II in FIG. 8 wherein 20 is a profile, matches with the similar profile 20 of side wall corner panel member 14. 22 are strengthening ribs.

In FIG. 11, 15 is a perspective view of a side wall straight panel member of a particular length. All side wall straight panel members have the same width for 15 and 14 with matching, width-wise and length-wise holes 27 in flange 66. These panels 15 are made as variants of parts with different lengths, to suit desired size of enclosure.

The depth of desired size of the enclosure is determined by the width of all side wall panel members 14 and 15, for increasing the depth in steps of the width of 14 & 15 may be increased or two or more side wall panel members of same type and length are joined together along the flange through holes 27 with gaskets and nuts & bolts side by side such that all the boss 21 are in one line. While joining holes 27 at pocket 34, special nut & bolts are to be used, or one pocket 34 may be machined out. Similarly, two members of 15 may be joined to each other along their flange through holes 27 length-wise to get double width. For other enclosure depths side wall panel members 15, and side wall corner panel member 14 have to made with different desired widths and suitable lengths.

FIG. 12 is a sectional view at CC of FIG. 1 showing the joint between a side wall corner panel 14 and side wall straight panel 15 joined at the flanges, with sealing means 29 and joining means 54.

FIG. 13 is a sectional view at BB in FIG. 1 showing details at a corner junction of panel 14 and 15, joined with joining means 49 with integral nut 28 with sealing means 29 in between.

When at least four side wall corner panel member 14 are joined with a series of side wall straight panel member 15 of different lengths as shown in FIG. 12 and FIG. 13, a side wall panel assembly 13 is formed with peripheral flanges comprising of holes 27 on both open ends to receive the front and back assembly.

However, care to be taken before such assembly that the nuts 53 are placed at each pocket 34 on all of the four side wall corner panels 9 as these places are not accessible for later assembly of the other members. Since the member 19 covers this extreme holes 27 position for later assembly, these pockets 34 hold the nut in position and prevent from rotation when tightened by a bolt from the other end.

Figure 14:
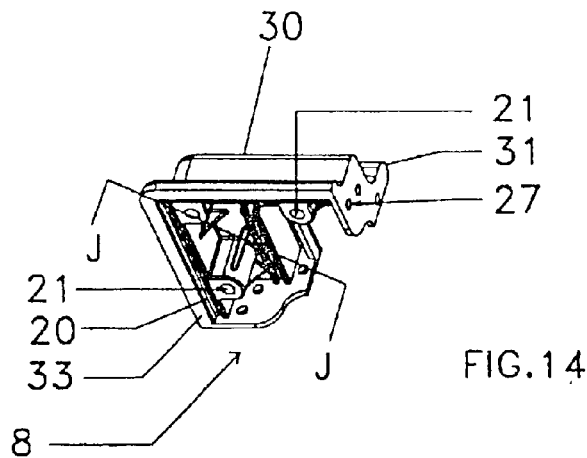
FIG. 14. is a perspective view of a sidewall frame corner member.
Figure 21:
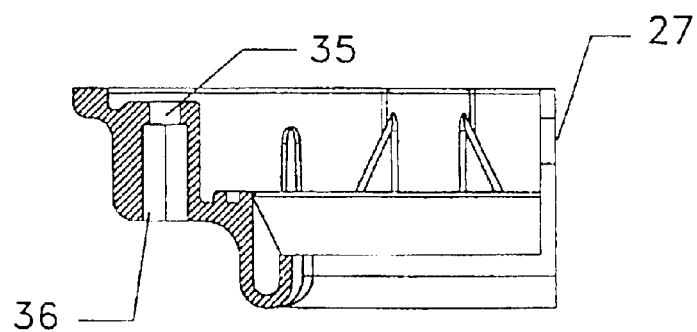
FIG. 21. is a sectional view at JJ of FIG. 14.

FIG. 14. is a perspective view of a sidewall frame corner member 8 which has an outer profile with a tongue like projection 31 on outer profile 30 and with two flanges at either ends with holes 27 matching corresponding holes 27 at the other end. On the inside, the thick outer flange has a flat surface 33 with a profile 20 and is joined by the boss 21 having an integral metal nut 37 below. FIG. 21 shows a sectional view at JJ of FIG. 14. The corner boss 21 at junction has a round counter bore 35 and a square or hexagonal counter-bore 36 as shown in FIG. 21.

Figure 15:
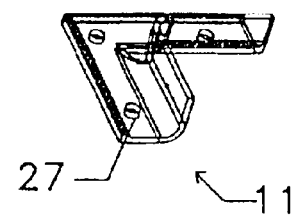
FIG. 15. is a perspective view of a sidewall frame corner stiffening member.

FIG. 15 is a perspective view of a sidewall frame corner stiffening member 11 to suit side wall frame corner member 8, formed like an 'L' angle and matching profile 20 at one end and the other end rest between ribs 34 and having thro' holes 27 matching 21 positions of 8.

Figure 16:
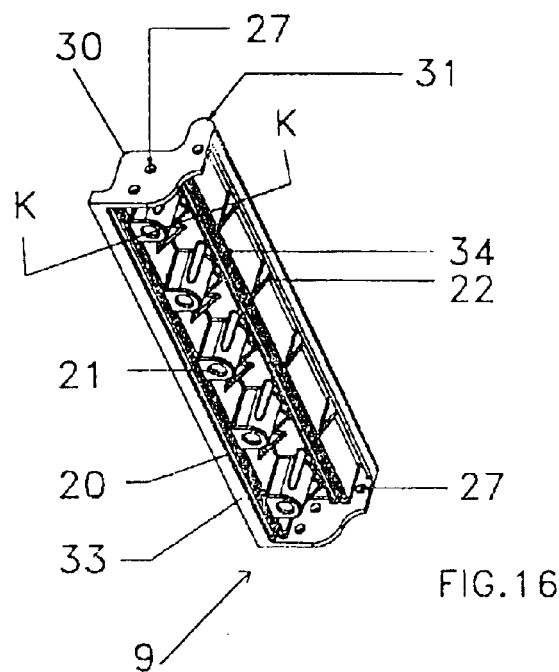
FIG. 16. is a perspective view of an elongated straight sidewall frame member.

FIG. 16 is a perspective view of an elongated straight side wall frame member 9, of a standard length, and has a similar outer and inner profile as 8, and with boss 21 and same tongue projection 31. The elongated straight side wall frame members 9 are made in different lengths such that four side wall frame corner members 8 along with required lengths of straight side wall frame member 9 forms the side wall frame assembly 7 of the required size.

Figure 17:
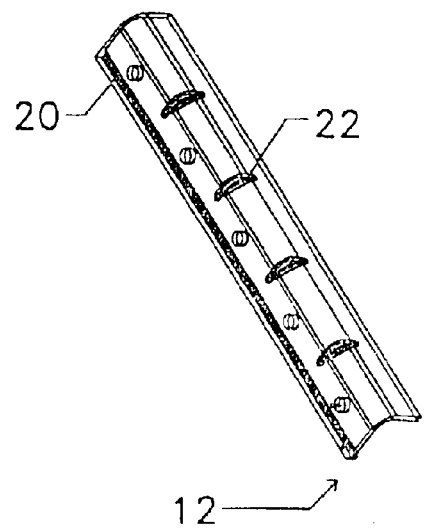
FIG. 17. is a perspective view of an elongated straight sidewall frame stiffener.

FIG. 17 is a perspective view of an elongated straight sidewall frame stiffener 12, formed like an 'L' angle and with the matching groove 20 of straight side wall frame member 9 similar to the side wall frame corner stiffening member 11. Straight side wall frame stiffener 12 is made in different lengths to suit each straight side wall frame members 9 of different lengths.

Figure 18:
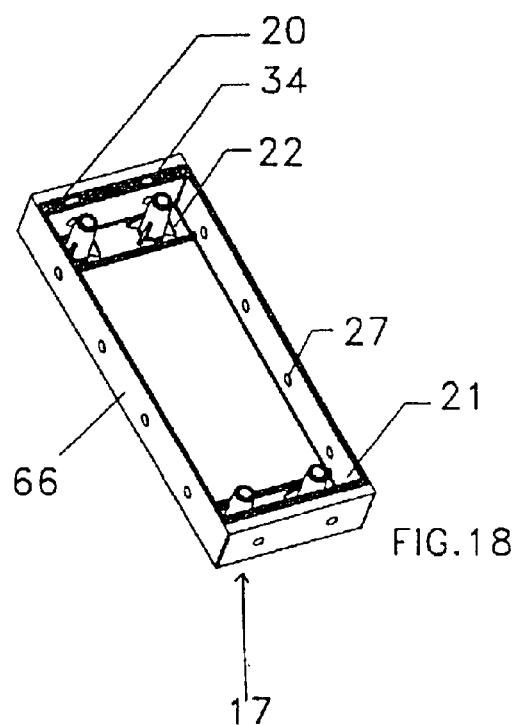
FIG. 18. is a perspective view of a middle corner support member.

FIG. 18 is a perspective view of a middle corner support member 17.

Figure 19:
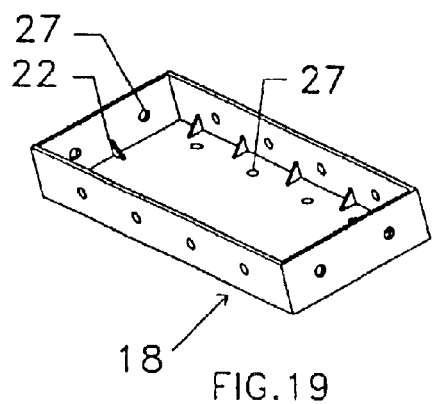
FIG. 19 is a perspective view of a middle straight support member.

FIG. 19 is a perspective view of middle straight support member 18. Both these panels have same width to accommodate two side wall frame assembly 7 and door assembly 3. The length of the middle corner support member 17 is equal to the width of the side wall corner panel member 14 and side wall straight panel member 15 and middle straight support member 18 is made in different lengths to suit the desired size of enclosure. Member 17 is provided with corner fixing means 67 at both the ends.

Figure 20:
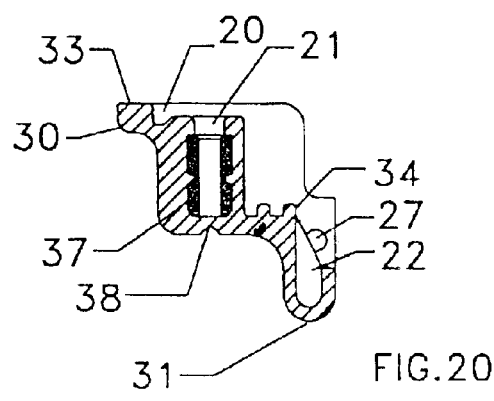
FIG. 20. is a sectional view at KK of FIG. 16

FIG. 20 is a section at KK in FIG. 16 of elongated straight side wall frame member 9 wherein 38 is a pip indicating the location of integral nut 37 below which when opened exposes the integral nut 37 for fixing the hinge-lock mechanism 47, from the other outer end.

FIG. 21 is a sectional view at JJ in FIG. 14

Figure 22:
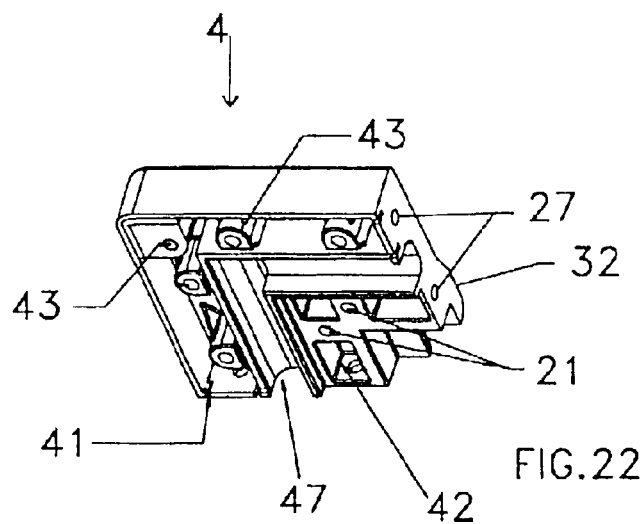
FIG. 22. is a perspective view of door frame corner member.

FIG. 22 is a perspective view of door frame corner member 4 wherein 43 and 21 are two rows comprising bosses provided on outside and inside. 32 is the outer profile. 41 are the grooves located at the end flanges in each another to located the stiffening member 46. 45 is the groove profile to match with the tongue profile 31 of side wall frame members 8 and 9. Pockets 42 are provided to reduce the mass and also to permit space for joining the members together. 44 is a flat surface provided on each of the members to fix and hold the cover sheet 6.

Figure 23:
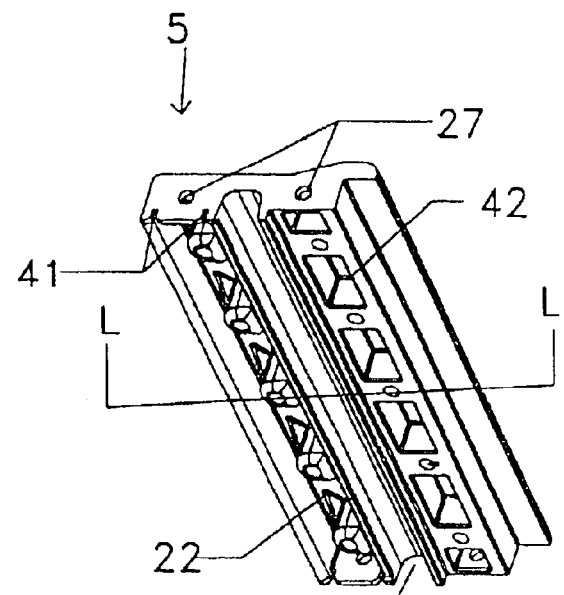
FIG. 23. is a perspective view of elongated straight door frame members

FIG. 23 is a perspective view of elongated straight door frame member 5, made in different lengths to suit the required assembly. Both the door frame corner member 4 and straight door frame members 5 have similar outer and inner profile and provided flanges at either ends with matching holes 27 to join with each other.

Figure 24:
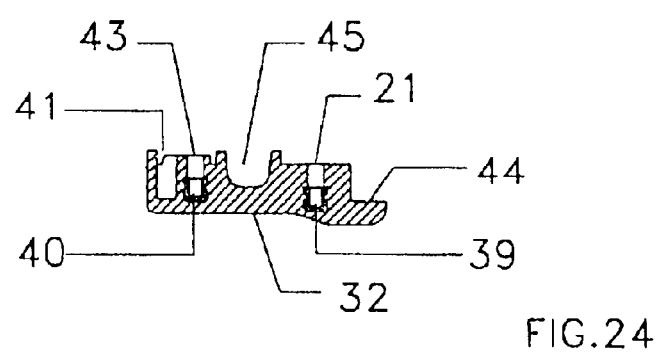
FIG. 24. is a sectional view at LL in FIG. 23.

FIG. 24 is a sectional view at LL in FIG. 23 showing the integral nuts 40 and 39 below boss 43 and 21 respectively.

Figure 25:
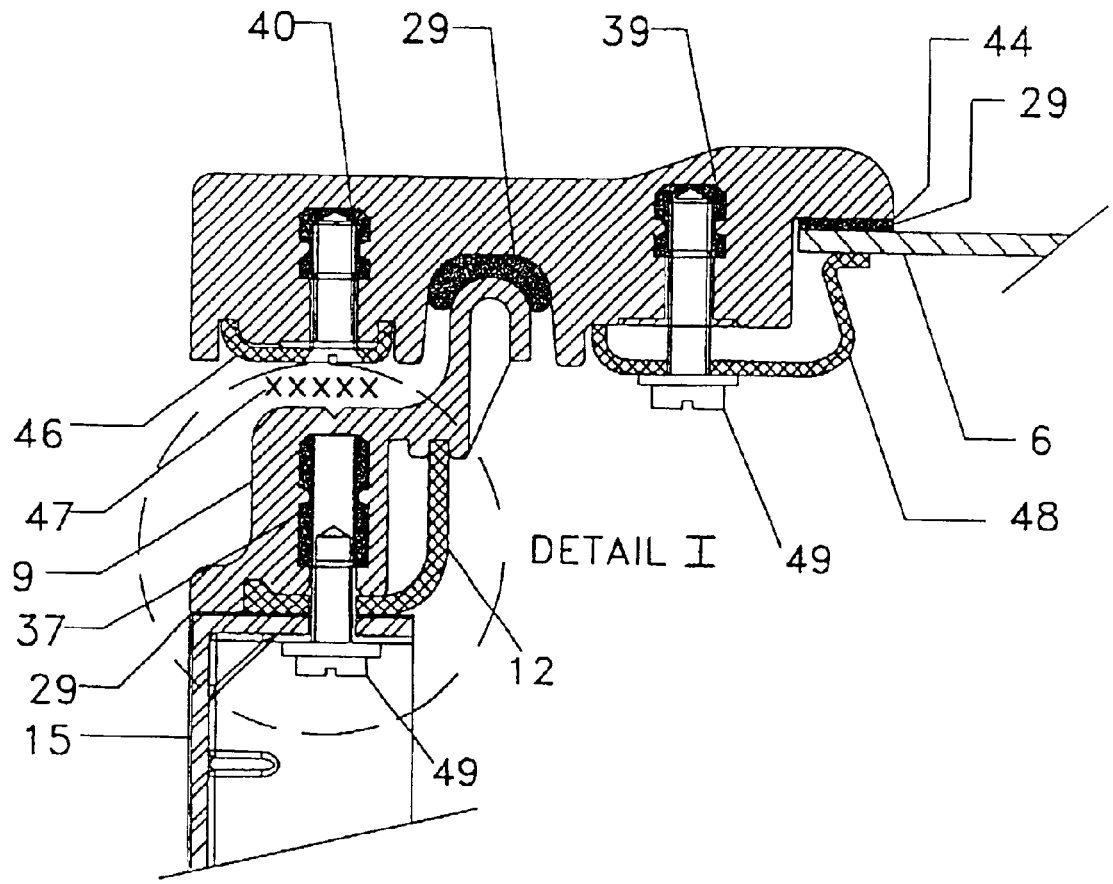
FIG. 25. is a sectional view at AA in FIG. 1.

FIG. 25 is a sectional view at AA in FIG. 1 wherein 29 is the sealing means compressed between the continuous tongue and groove providing the necessary ingress protection for the enclosure assembly 1 and 2. 46 is the stiffening member which matches the groove 41 and runs through and through the length of the door frame assembly 3 joining all the pieces on one side together with the outer row of integral nuts provided on the boss 43. 47 is the hinge-lock mechanism provided between the door assembly 1 and side wall assembly 2. 48 is a clamping member used for clamping the sheet member on to the door frame assembly 3, with the inner row of integral nuts 39 with sealing means 29 in between.

Figure 26:
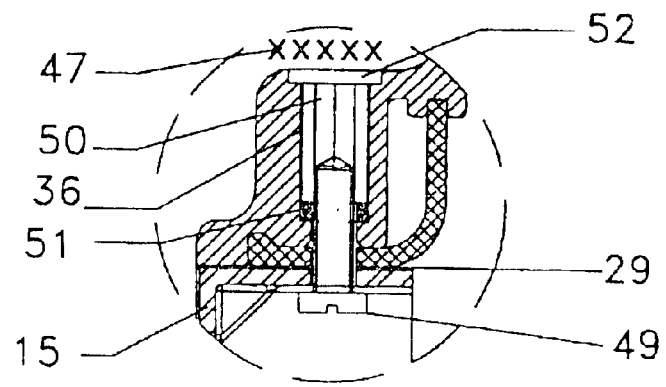
FIG. 26. is another embodiment of the detail I in FIG. 25.

FIG. 26 is another embodiment of the detail I in FIG. 25 wherein 50 is the non-integral metal nut provided in counter bore 36 in each of the side wall frame members, as an alternate to providing integral nut, at those positions. 51 is a sealing means for 49. 52 is a counter-bore provided to fix a cap if required to close the open end.

Figure 27:
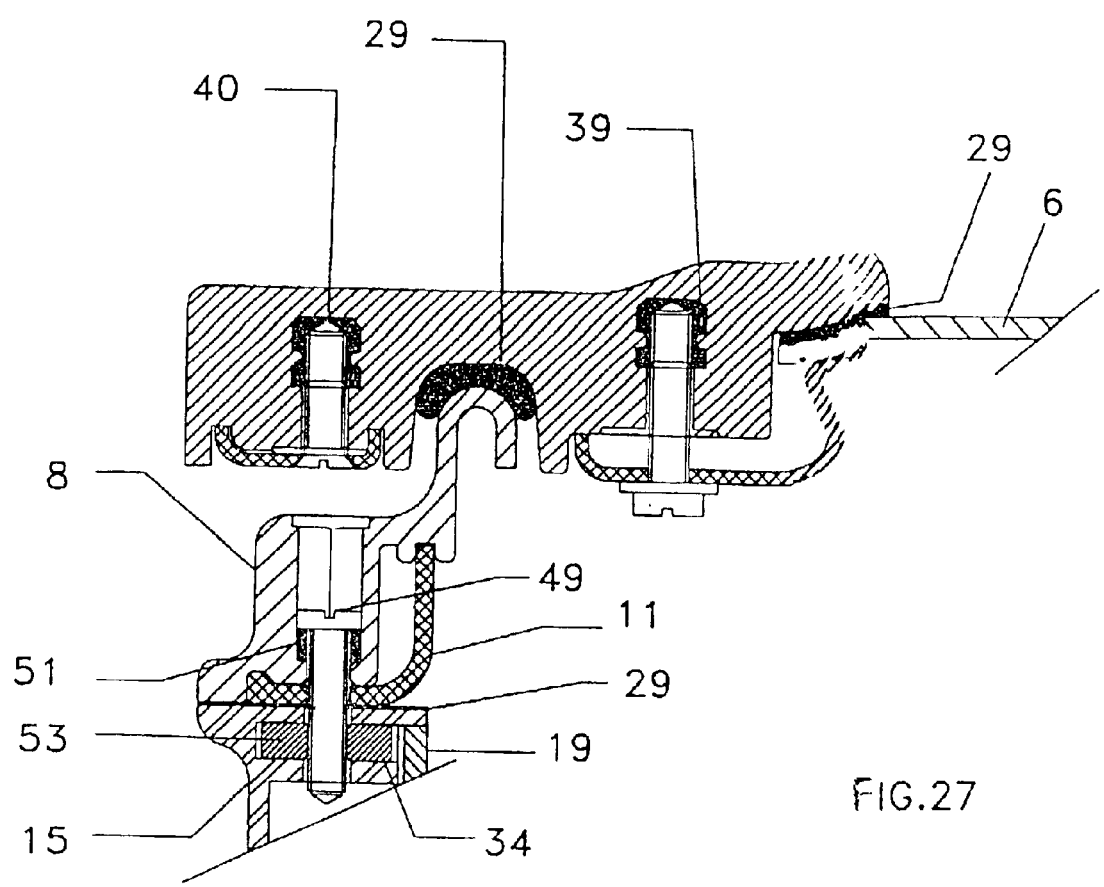
FIG. 27. is a sectional view at EE in FIG. 1

FIG. 27 is a section view at EE in FIG. 1, at the corner of assembly 1 and 2 showing the joining means wherein bolt 49 joins members 8, 11 and 15 of assembly 2 at each corner by bolting on to nut 53 provided in the pocket 34 of 15.

FIG. 28 is another embodiment of the section AA in FIG. 1 wherein instead of providing hinge-lock mechanism 47, assembly 1 and 2 are sealingly closed by means of screws 49 provided at sufficient places to effect necessary sealing 29 at tongue and groove junction all around the periphery.

FIG. 29 is a sectional view at DD in FIG. 1 showing the back sheet cover 16, fixed to the straight side wall frame member 9 at nut 53 located on the pocket34.

FIG. 30 is a sectional detail view at FF in FIG. 5 wherein 18 is the middle straight support member and the two independent door assembly 1 joined to side wall assembly 2 at middle straight support member 18.

Figure 31:
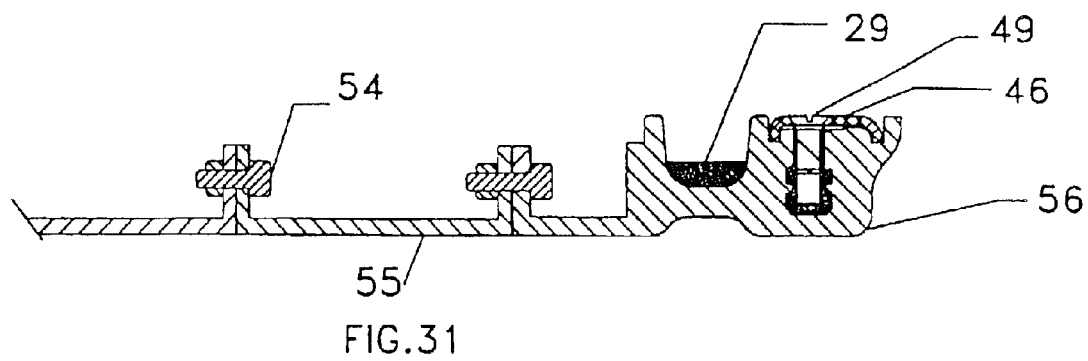
FIG. 31 is a part sectional view of another embodiment of the door assembly.

FIG. 31 is a part sectional view of another embodiment of the door assembly 1 wherein 56 is a door frame member having a flange instead of inner row of nuts and with matching holes 27 to clamp on to the door panel members 55 having similar matching flange holes 27, thereby, completing the required door assembly 1 with panels instead of a cover sheet 6. The door panel members 55 may be made with differing lengths and widths to suit the required sizes of enclosure. Door frame members 56 comprise of one type matching door frame corner members and elongated straight door frame members, of differing lengths to suit the desired size of enclosure.

Figure 32:
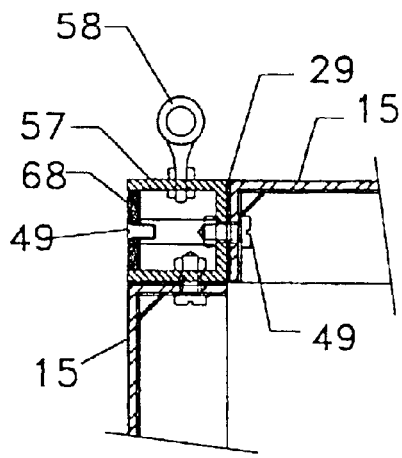
FIG. 32 is another embodiment of the sectional view at BB in FIG. 1.

FIG. 32 is an another embodiment of the sectional view at BB in FIG. 1 wherein instead using side wall corner panels 14, the sidewall panel assembly 13 is formed using side wall straight panel member 15 of required lengths and the corners joined by using a 'C' type side wall corner panel member 57. 58 is a standard eye bolt provided suitably on side wall corner panel member 57 for lifting the total enclosure. 68 is a plane cover member fixed to cover the member 57.

Figure 33:
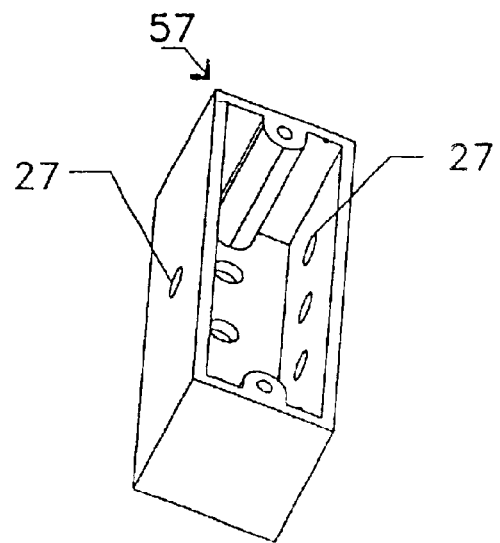
FIG. 33 is a perspective view of a 'C' type sidewall corner panel member

FIG. 33 is a perspective view of side wall corner panel member 57 showing the holes 27 and the boss with integral metal nut, for fixing cover 68. 57 have a width equal to the height of the flange and length equal to the width of side wall straight panel member 15.

Figure 34:
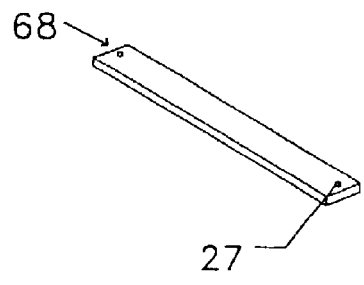
FIG. 34 is a perspective view of a cover for sidewall panel member

FIG. 34 is a perspective view of a cover for side wall panel member wherein 68 is a plane cover member with holes used for sealing the opening of 57.

Figure 35:
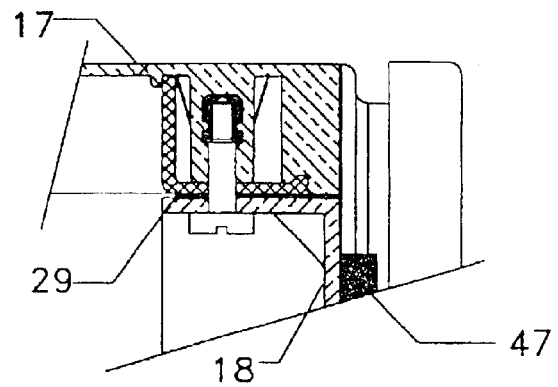
FIG. 35 is a sectional view at GG in FIG. 5.

FIG. 35 is a sectional view at GG in FIG. 5 showing the details at the junction of 17 and 18, wherein 29 is a stiffener member to match member 17.

Figure 36:
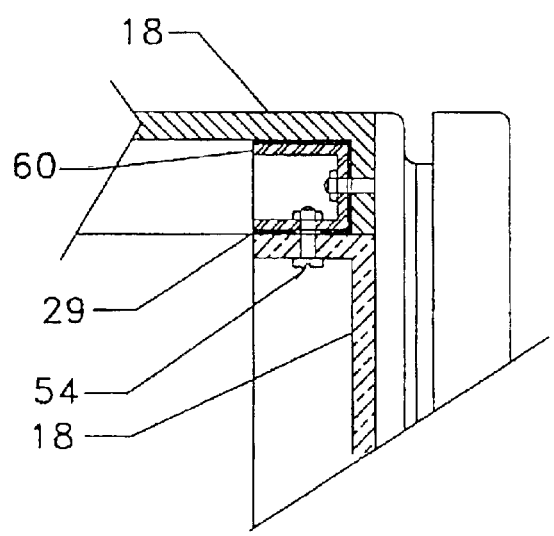
FIG. 36 is another embodiment of sectional view at GG in FIG. 5.

FIG. 36 is another embodiment of sectional view at GG in FIG. 5 wherein 18 is used instead of 17, with a 'C' type side wall panel member 60 which fix inside panel 18 as shown. Use of members 60 and 57 allow more standardization and ease of assembly, eliminating use of side wall corner panel member 14.

Figure 37:
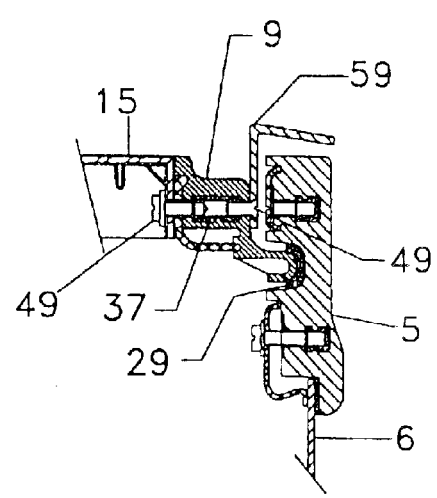
FIG. 37 is a sectional view of door frame assembly.

FIG. 37 is a sectional view at the top portion of another embodiment with a protective top cover 59, wherein 59 is a continuous profile joined to the assembly 7 at top to protect the top portion, of the enclosure from accumulation of dust, rain, etc.

Figure 38:
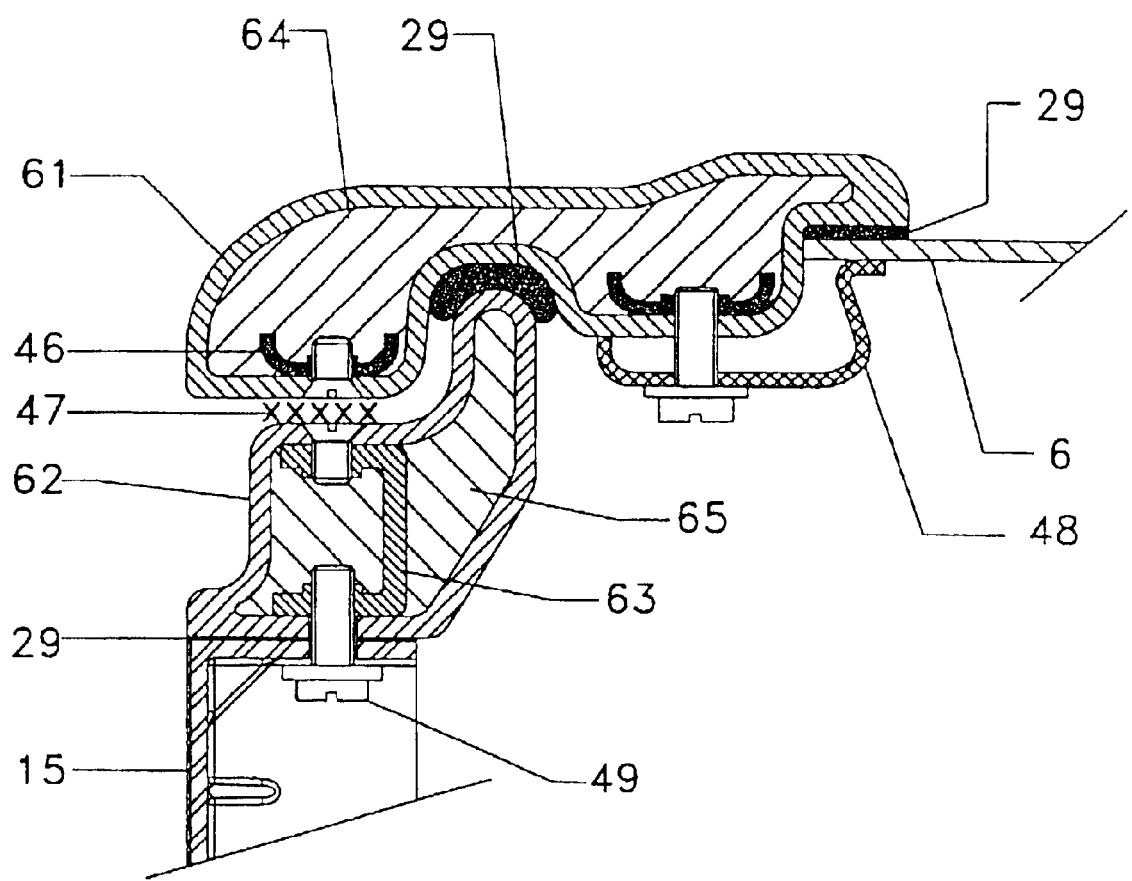
FIG. 38 is another embodiment of the sectional view at AA in FIG. 1.

FIG. 38 is another embodiment of the sectional view at AA in FIG. 1 wherein 61 is a continuous door frame member and 62 is a continuous side wall frame member preferably of an extruded type and with continuous length, is cut at matching angles at both ends to the required length and width of the desired enclosure as a single piece to form the four ends. 64 is a door frame corner member which has an outer profile, matching with the inner profile of 61. This door frame corner member 64 forms the corners of a door frame assembly, when member 61 is joined to another member 61 with sealing and joining means with 64 in between forms the corners of the door frame assembly. 65 is a side wall frame corner member which has an outer profile, matching with inner profile of member 62. This member 65 forms the corners of a door frame assembly, the members 62 are cut to required lengths and widths of door frame assembly as a single piece to form each of the four ends, with the corners cut at matching angles, and when joined and sealed with respective sealing and joining means with the corner member 65 inserted in between, the complete door frame assembly 3 is formed.

46 and 63 are the stiffening members, which are inserted before joining the members 61 and 62 with 64 and 65 respectively to provide additional strength and also to join the hinge-lock mechanism and the adjacent members.

Figure 39:
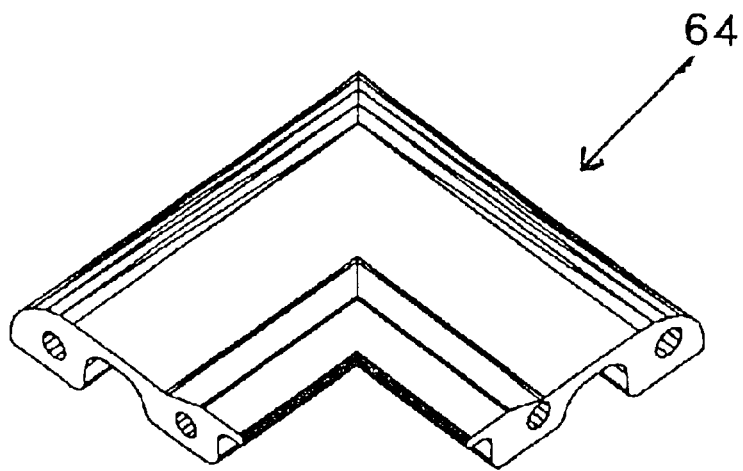
FIG. 39 is a perspective view of another embodiment of a door frame corner member

FIG. 39 is a perspective view of door frame corner member 64 to suit 61.

Figure 40:
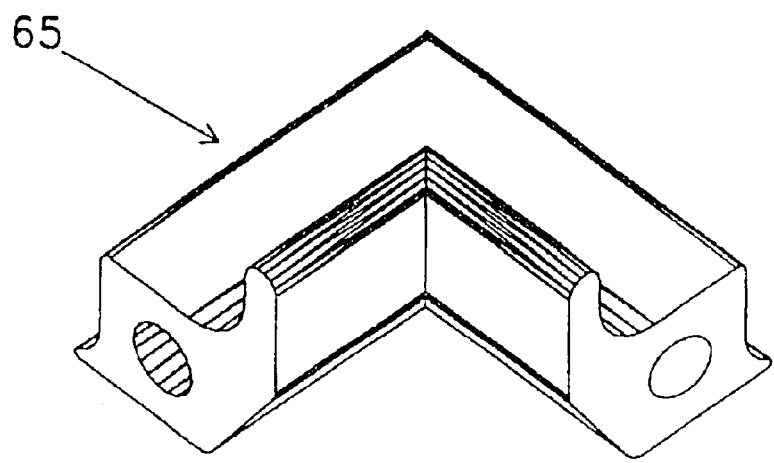
FIG. 40 is a perspective view of another embodiment of a sidewall frame corner member.

FIG. 40 is a perspective view of side wall frame conrer member 65 to suit 62.

What is claimed is:

1. A weatherproof enclosure with a modular structure suitable for outdoor use, said enclosure comprising a side wall assembly with covered front and back sides; at least one of the covered sides being provided with at least one door assembly; said side wall assembly comprised of a side wall panel assembly with a matching side wall frame assembly sealingly fixed all around the side wall panel assembly, the side wall panel assembly being constructed from plurality of side wall straight panel members with equal widths and predetermined lengths, each width side of the side wall straight panel member being sealingly joined to the width side of an adjacent side wall straight panel member, plurality of side wall corner panel members sealingly fixed to the width sides of the adjacent side wall straight panel members to form corners of the side wall panel assembly, said side wall frame assembly consisting of plurality of elongated straight side wall frame members sealingly joined end to end and provided with plurality of side wall frame corner members joined to the ends of the adjacent elongated straight side wall frame members to form corners of the side wall frame assembly matching with the corners of the side wall panel assembly; the door assembly comprising a door frame assembly and a cover sheet sealingly fixed to the door frame assembly, said door frame assembly consisting of plurality elongated straight door frame members having predetermined lengths and sealingly joined end to end, plurality of door frame corner members sealingly joined with the adjacent elongated straight door frame members to form the door frame assembly; and a hinge-lock mechanism being provided between the door assembly and the side wall frame assembly for sealingly closing the door assembly against the side wall assembly.

2. The enclosure as claimed in claim 1, wherein the enclosure is a rectangular enclosure comprising a rectangular side wall assembly consisting of a rectangular side wall panel assembly with a matching rectangular side wall frame assembly sealingly fixed all around the said rectangular side wall panel assembly and at least one rectangular door assembly on front side and/or back side of the rectangular side wall frame assembly, the angular door assembly consisting of a rectangular door frame assembly and a rectangular cover sheet sealingly fixed on to the said rectangular door frame assembly and the hinge-lock mechanism is provided between the rectangular door frame assembly and the side wall frame assembly for sealingly closing the door assembly against the side wall assembly.

3. The enclosure as claimed in claim 2, wherein each said side wall straight panel member is of rectangular shape having equal widths and equal lengths.

4. The enclosure as claimed in claim 2, wherein each said side wall straight panel member is of rectangular shape having equal widths and unequal lengths.

5. The enclosure as claimed in claim 1, wherein between the side wall panel assembly and the side wall frame assembly, a stiffener assembly is provided, said stiffener assembly comprising plurality of matching elongated straight side wall frame stiffener members located in a groove in said side wall frame assembly and side wall frame corner stiffener member matching with the profile of said elongated straight side wall frame members and side wall frame corner members.

6. The enclosure as claimed in claim 1, wherein each said side wall straight panel member is provided with fixing means for sealingly fixing the width side of each said side wall straight panel member to the adjacent width side of the next side wall straight panel member and the length side of the side wall straight panel member to the elongated straight side wall frame member.

7. The enclosure as claimed in claim 6, wherein each said side wall straight panel members provided with flanges on all the four sides with plurality of holes and plurality stiffening ribs along the corner formed by the flanges.

8. The enclosure as claimed in claim 1, wherein each said side wall corner panel member is provided with flanges on the sides along the length and one side along the width with plurality of fixing holes and stiffening ribs and on the fourth side along the width is being provided with corner fixing means for sealingly fixing the adjacent width side of the adjacent side wall straight panel member to form the corners of the side wall panel assembly.

9. The enclosure as claimed in claim 8, wherein the corner fixing means is provided at the inside portion of a corner forming side of the side wall corner panel member and said fixing means comprises a plurality of bosses spaced apart, a matching groove with end pockets on a matching profile and an integral nut located on the lower part of each said boss to receive a screw through a sealing member provided between the side wall corner panel member and the adjacent side wall straight panel member.

10. The enclosure as claimed in claim 1, wherein each elongated side wall straight panel member is provided with fixing means spaced apart along the length, plurality of stiffening ribs spaced apart along the length, a flat surface along the length matching with the edges of the side wall straight panel member, a groove along the length for accommodating the corresponding elongated side wall straight panel member and the elongated ends of the said elongated straight side wall frame member are provided with fixing means on a tongue-shaped profile.

11. The enclosure as claimed in claim 10, wherein the fixing means comprises a plurality of bosses with an integral nut.

12. The enclosure as claimed in claim 1, wherein the inside portion of each said side wall frame corner member facing the side wall corner panel member is provided with fixing means on the joining edge surface of said side wall corner panel member and the ends of the side wall frame corner members are provided with fixing means and matching surfaces for sealingly joining the adjacent ends of the elongated straight side wall frame members.

13. The enclosure as claimed in claim 1, wherein each of the elongated straight door frame members is provided with a groove along the length, which matches with the profile of a tongue provided on each said elongated straight side wall frame member.

14. The enclosure as claimed in claim 1, wherein each of the door frame corner members is provided with a groove for receiving a door frame stiffening member, a plurality of relief pockets for sealingly joining the door frame corner member with the adjacent elongated straight door frame member.

15. The enclosure as claimed in claim 1, wherein each said door assembly at the front side and/or at the back side of the side wall assembly is a double door assembly having a pair of identical door assemblies as that of the single door assembly separated by a middle support assembly and each door assembly being provided with the hinge-lock mechanism.

16. The enclosure as claimed in claim 1, wherein the door assembly comprises of a plurality of door frame members, wherein said door frame members are comprised of door frame corner members and elongated straight door frame members of differing lengths and said door frame members are sealingly joined to a plurality of door panel members of differing lengths and widths to form the desired door assembly.

* * * * *